O. C. LOHSE.
AUTOMOBILE PROTECTIVE DEVICE.
APPLICATION FILED JULY 9, 1917.

1,336,306. Patented Apr. 6, 1920.
2 SHEETS—SHEET 1.

WITNESSES
J. H. Crawford.
R. M. Smith.

INVENTOR
O. C. Lohse,
BY Victor J. Evans
ATTORNEY

O. C. LOHSE.
AUTOMOBILE PROTECTIVE DEVICE.
APPLICATION FILED JULY 9, 1917.
1,336,306.
Patented Apr. 6, 1920.
2 SHEETS—SHEET 2.
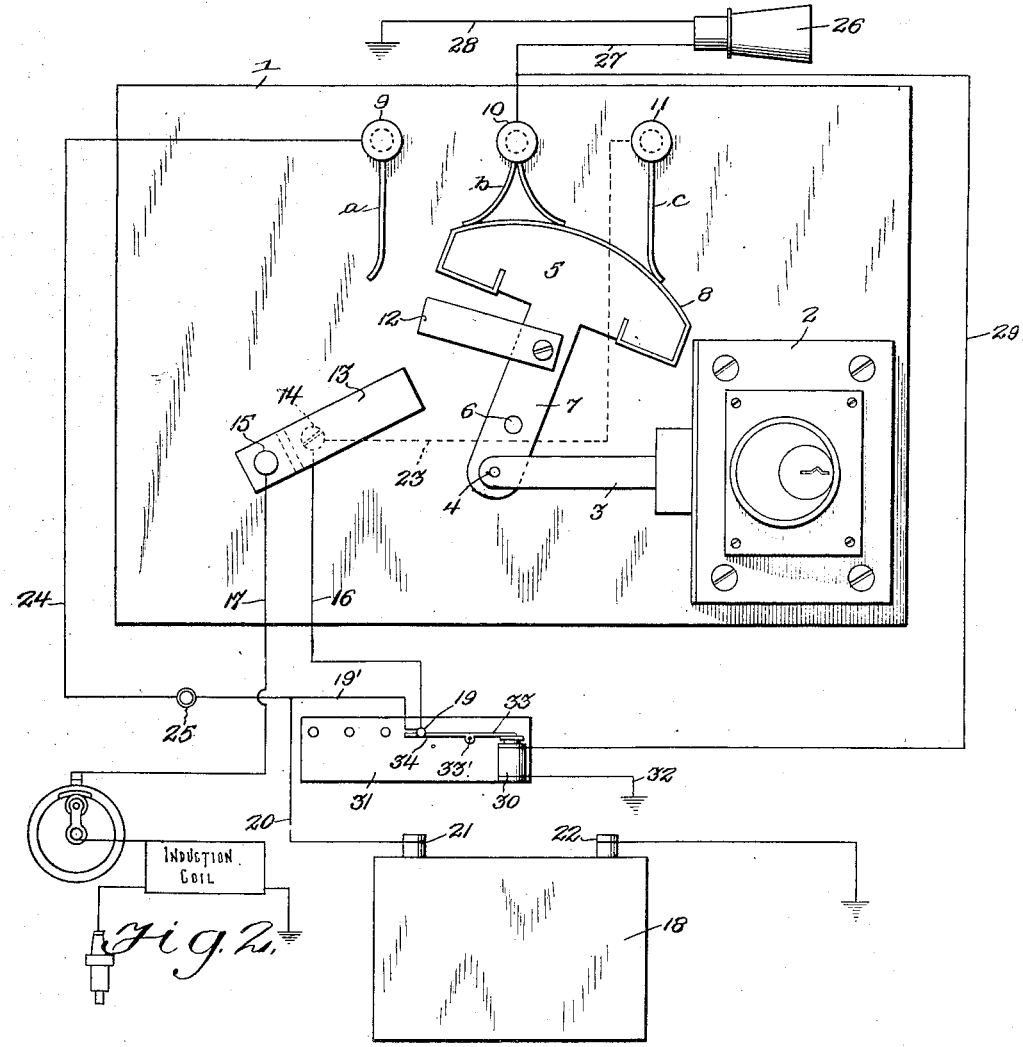
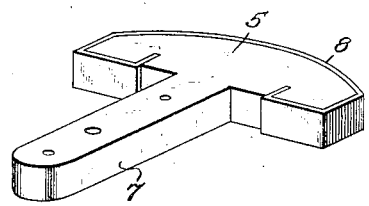
INVENTOR
O. C. Lohse,
WITNESSES
BY Victor J. Evans
ATTORNEY

UNITED STATES PATENT OFFICE.

OTTO C. LOHSE, OF BLOOMINGTON, ILLINOIS.

AUTOMOBILE PROTECTIVE DEVICE.

1,336,306.   Specification of Letters Patent.   Patented Apr. 6, 1920.

Application filed July 9, 1917. Serial No. 179,508.

*To all whom it may concern:*

Be it known that I, OTTO C. LOHSE, a citizen of the United States, residing at Bloomington, in the county of McLean and State of Illinois, have invented new and useful Improvements in Automobile Protective Devices, of which the following is a specification.

This invention relates to automobile protective devices the broad object in view being to provide in conjunction with the electric systems of motor vehicles, simple means whereby the audible signal or horn circuit may be interrupted or broken when the machine is left standing without an attendant and whereby also the ignition circuit is broken or interrupted, and a shunt circuit formed which, when the ignition switch is closed, will cause the horn or other audible signal to be sounded.

As a result of the construction herein shown and described, when the mechanism is set in locked or protective position, a pressure on the button of the audible signal will produce no effect on said signal, while a closing of the ignition switch on the part of an unauthorized person attempting to start the vehicle will result in a sounding of said audible signal, thus notifying the owner of the machine that it is being tampered with by an unauthorized person. The device is also useful in that it prevents any person from sounding the audible signal or horn in the absence of the owner of the vehicle and wasting the electrical energy of the battery or the equivalent thereof.

With the above and other objects in view, the invention consists in the novel construction, combination and arrangement of parts, herein described, illustrated and claimed.

In the accompanying drawings:—

Fig. 2 is a similar view showing the arrangement of the working parts when set to protect the vehicle;

Fig. 4 is a detail view of the bridging member.

Figures 1, 3, 5:
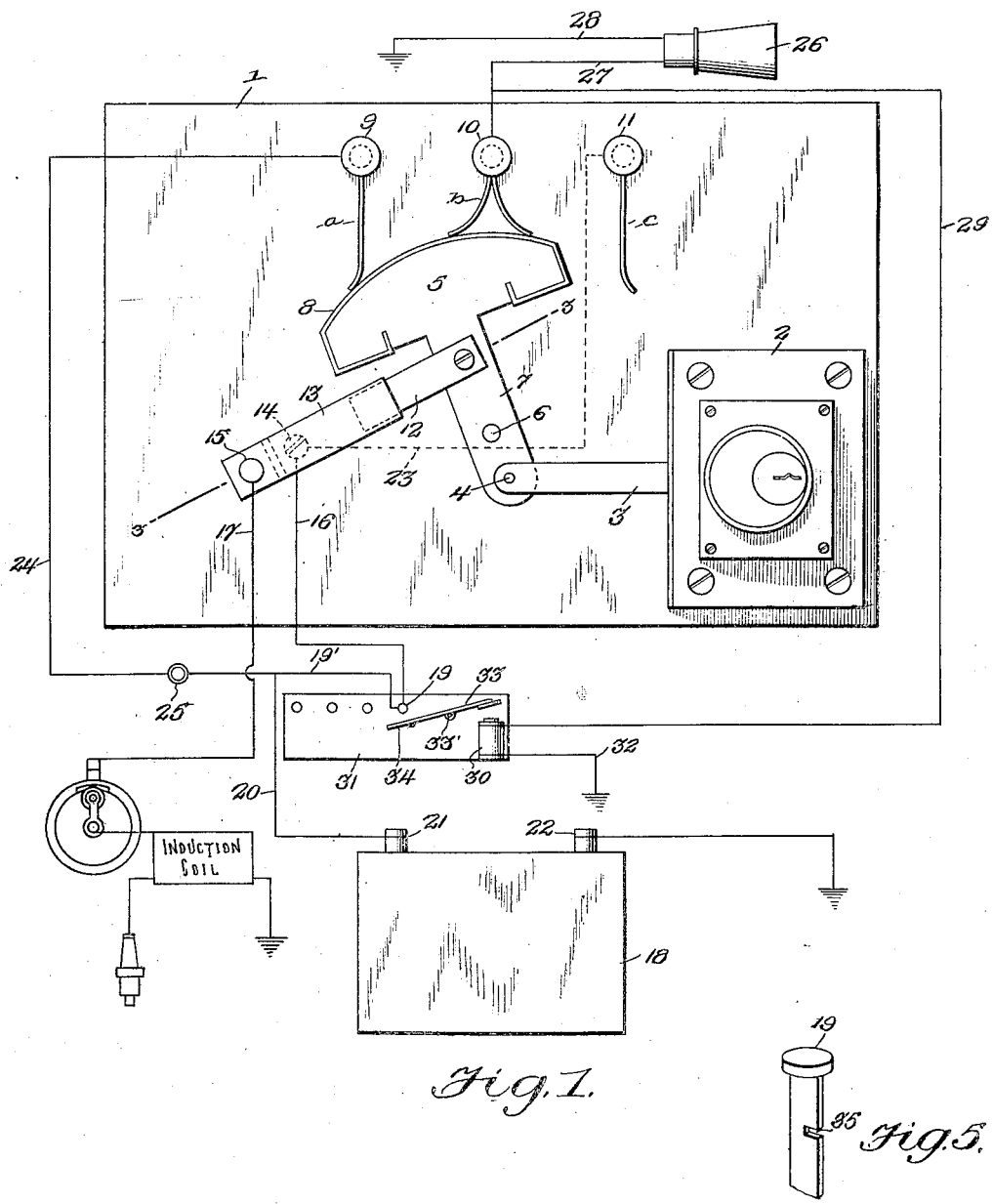
Figure 1 is a view partly in elevation and partly in diagram, illustrating the improved protective apparatus or device, showing the working parts in their normal running condition.
Fig. 3 is a fragmentary section on the line 3—3 of Fig. 1.
Fig. 5 is a fragmentary view of the ignition switch.

Referring to the drawings 1 designates a base upon which the several parts of the apparatus are mounted, said base being of any suitable insulating material. The base 1 and the mechanism carried and supported thereby and hereinafter particularly described may of course be inclosed in a suitable casing which casing however is not essential to the carrying out of the present invention and has therefore been omitted from the drawings.

Fastened to the base 1 is a lock casing 2 having an extended bolt 3 which is connected by a pivot 4 to a bridging member 5 mounted pivotally at 6 on the base 1. The bridging member 5 is of any suitable insulating or non-conducting material and comprises an arm 7 to which the bolt 3 is pivotally connected at 4. The working face of the bridging member is arcuate as shown and said arcuate face is covered by a metal strip 8 to form a bridging element between a series of terminals or contacts $a$, $b$ and $c$, the said contacts being connected with and projecting from binding posts 9, 10 and 11 attached to the base 1.

Extending from the bridging member 5 is a switch blade 12 adapted to be inserted between the arms 13 of a knife switch, (see Fig. 3) said arms having binding posts 14 and 15 to which are connected the ignition circuit wires 16 and 17. The wire 16 leads through the ignition switch 19 and through a bus bar 19′ and wire 20 to the positive pole 21 of a battery 18. A wire 24 leads through a button 25 to the post 9 of the contact $a$. The wire 17 leads from the post 15 to the ground formed by the chassis of the vehicle. From the post 10 a wire 27 leads to the horn or audible signal 26 and a return wire 28 leads therefrom to the ground, formed by the chassis of the vehicle thence to the negative pole 22 of the battery 18. A wire 23 leads from the post 14 of the knife switch to the post 11 of the contact C. A branch wire 29 leads from the wire 27 to a small electromagnet 30 on the ignition switchboard 31, a return wire 32 leading from the magnet 30 to ground which is formed by the chassis of the vehicle thence to the negative pole 22 of the battery 18. A latch 33 pivotally mounted on the switchboard 31 at 33′ is attracted by the magnet 30 and the arm 34 of said latch swings into engagement with a notch 35 in the shank of the ignition button or switch 19 so as to lock the same in a closed position and prevent the reopening of the ignition switch by any person who is tampering with the machine.

When an unauthorized person attempts to start the machine by closing the ignition switch 19, the current flows from the positive pole 21 of the battery 18 through the wire 20, switch 19, wire 16, post 14, wire 23, post 11, contact *c*, bridge 8, contact *b*, post 10, wire 27 to audible signal 26 and then to ground and returns through the negative pole 22 of the battery. Another part of the current passes through the branch wire 29 and energizes the magnet 30, which attracts the latch 33 and moves the arm 34 thereof into locked engagement with the notch 35 of the ignition switch 19. This prevents the switch from being opened so that the audible alarm 26 will be sounded continuously until the owner or authorized operator of the machine is warned. Under the normal arrangement of the parts illustrated in Fig. 1, the closing of the ignition switch 19 is accompanied by the usual operation of the parts and no shunt circuit is formed to energize the audible signal 26 nor the electrode magnet 30.

As a result of the construction hereinabove described and shown, considerable electrical energy is saved, boys and other persons are prevented from sounding the audible signal or horn, and an attempt to operate the vehicle is frustrated by the sounding of the alarm or signal when the ignition switch is closed preparatory to starting the machine.

I claim :—

An automobile protective device, embodying an ignition circuit, a service ignition switch controlling said circuit, an audible alarm circuit, means for breaking the alarm circuit and simultaneously shunting the ignition circuit through the audible alarm, lock mechanism controlling said means, and an electrically controlled latch which acts to automatically lock the service ignition switch closed.

In testimony whereof I affix my signature.

OTTO C. LOHSE.